(12) United States Patent
Jiang et al.

(10) Patent No.: US 10,781,345 B1
(45) Date of Patent: Sep. 22, 2020

(54) METHOD OF PREPARING POLYURETHANE HOT MELT ADHESIVE WITH HIGH TEMPERATURE RESISTANCE

(71) Applicant: Yantai Darbond Technology Co., Ltd., Yantai (CN)

(72) Inventors: Guilin Jiang, Yantai (CN); Jianbin Wang, Yantai (CN); Tianan Chen, Yantai (CN); Haihua Xie, Yantai (CN)

(73) Assignee: Yantai Darbond Technology Co., Ltd., Yantai (CN)

( * ) Notice: Subject to any disclaimer, the term of this patent is extended or adjusted under 35 U.S.C. 154(b) by 0 days.

(21) Appl. No.: 16/763,558

(22) PCT Filed: Nov. 27, 2017

(86) PCT No.: PCT/CN2017/113001
§ 371 (c)(1),
(2) Date: May 13, 2020

(87) PCT Pub. No.: WO2019/100357
PCT Pub. Date: May 31, 2019

(51) Int. Cl.
| | |
|---|---|
| *C09J 175/08* | (2006.01) |
| *C08G 18/48* | (2006.01) |
| *C08G 18/77* | (2006.01) |
| *C08G 18/24* | (2006.01) |
| *C08G 18/26* | (2006.01) |
| *C08G 18/73* | (2006.01) |
| *C08G 18/76* | (2006.01) |
| *C08K 5/548* | (2006.01) |
| *C08K 5/544* | (2006.01) |
| *C08K 5/101* | (2006.01) |
| *C08K 5/43* | (2006.01) |
| *C08G 65/26* | (2006.01) |
| *C08G 63/16* | (2006.01) |
| *C08G 18/12* | (2006.01) |

(52) U.S. Cl.
CPC ............ *C09J 175/08* (2013.01); *C08G 18/12* (2013.01); *C08G 18/242* (2013.01); *C08G 18/26* (2013.01); *C08G 18/48* (2013.01); *C08G 18/73* (2013.01); *C08G 18/7621* (2013.01); *C08G 18/77* (2013.01); *C08G 63/16* (2013.01); *C08G 65/2627* (2013.01); *C08K 5/101* (2013.01); *C08K 5/43* (2013.01); *C08K 5/544* (2013.01); *C08K 5/548* (2013.01); *C08G 2170/20* (2013.01); *C09J 2475/00* (2013.01)

(58) Field of Classification Search
CPC ..................................................... C09J 175/08
See application file for complete search history.

(56) References Cited

U.S. PATENT DOCUMENTS

2017/0002239 A1* 1/2017 Janke ..................... C09J 175/06

FOREIGN PATENT DOCUMENTS

| | | |
|---|---|---|
| CN | 101050223 A | 10/2007 |
| CN | 104531038 A | 4/2015 |
| CN | 104804699 A | 7/2015 |
| CN | 105131896 A | 12/2015 |
| CN | 106232668 A | 12/2016 |
| CN | 106318309 A | 1/2017 |
| CN | 106589286 A | 4/2017 |
| CN | 107163898 A | 9/2017 |
| WO | 2017108873 A1 | 6/2017 |

* cited by examiner

*Primary Examiner* — Daniel H Lee
(74) *Attorney, Agent, or Firm* — Bayramoglu Law Offices LLC

(57) ABSTRACT

A method of preparing polyurethane hot melt adhesive with high temperature resistance generally includes the following steps: (1) adding isocyanate with a silane modifier in a reactor in an inert atmosphere, heating and stirring, then adding chemical dehydrant into the reactor and mixing evenly; (2) adding dehydrated diluent and tackifier resin to the reactor while maintaining the inert atmosphere and heating, adding dehydrated polyester polyol and polyether polyol, stirring, and allowing to react at constant temperature for a predetermined time period; (3) adding dehydrated polyether amine, stirring, and heating; and (4) adding a catalyst, vacuumizing, discharging materials and packaging the materials in an airtight container. The hot melt adhesive made according to the new method has a variety of improved physical and mechanical properties, including improved high temperature resistance, cold and heat shock resistance, drop resistance toughness, high adhesive strength, salt spray resistance and moisture and heat aging resistance.

20 Claims, No Drawings

METHOD OF PREPARING POLYURETHANE HOT MELT ADHESIVE WITH HIGH TEMPERATURE RESISTANCE

CROSS REFERENCE TO THE RELATED APPLICATIONS

This application is the national phase entry of International Application No. PCT/CN2017/113001, filed on Nov. 27, 2017, the entire contents of which are incorporated herein by reference.

TECHNICAL FIELD

The present invention relates to chemical adhesives, and more particularly, relates to a method of preparing polyurethane hot melt adhesive with high temperature resistance.

BACKGROUND

In recent years, as concern for the environment has increased, the population has embraced eco-friendly products, including the development of eco-friendly adhesives. These adhesives have gradually become preferred over their more toxic counterparts because they are easy and convenient to use as well as being less harmful to the environment. As a result, one high-performance, eco-friendly adhesive that has grown in popularity is reactive polyurethane hot melt adhesive (PUR).

PUR adhesive has several advantageous physical and mechanical properties, including fast-bonding, non-toxic, simple process, high adhesive strength and good flexibility. Therefore, PUR has many applications and is used across most industries, from textile, woodworking and home appliance to consumer electronics and aerospace.

However, traditional PUR has a serious defect, namely, a poor high temperature resistance. Traditionally, PUR is formed by reaction of polyester or polyether diol with diisocyanate. The molecular structure of traditional PUR is linear, and contains many flexible segments, so traditional PUR cannot meet temperature resistance bonding requirements above 100° C.

Advancements in industry, science and technology have produced a substantial increase in market demand for high temperature resistant PUR. Therefore, the research and development of a high temperature resistant PUR adhesive material has become an urgent demand in this field.

The research and development of high temperature resistant adhesive materials achieves fast progress in foreign countries, but starts late in China. Moreover, there are relatively few research and development institutions, mainly represented by Yantai Debang Technology Co., Ltd. Therefore, high temperature resistant PUR has substantial market potential.

SUMMARY

The present invention provides a method of preparing polyurethane hot melt adhesive with high temperature resistance, solving the disadvantage of poor high temperature resistance of existing polyurethane hot melt adhesive.

The technical solution adopted by the present invention to solve the above-mentioned technical problem is as follows.

A method of preparing polyurethane hot melt adhesive with high temperature resistance, including the following steps in parts by weight:

1) adding 10-20 parts of isocyanate with an average functionality of more than 2.5 to a reactor while maintaining an inert atmosphere, heating the reactor to 60-80° C., then adding 0.3-3.0 parts of silane modifier to the reactor, and stirring while maintaining a constant temperature of 60-80° C. for 1-3 hours to obtain isocyanate derivatives with an average functionality of 1.5-2.0 from a reaction, and then adding 0.005-0.04 parts of chemical dehydrant into the reactor and mixing evenly;

2) adding 1-5 parts of dehydrated diluent and 7-20 parts of tackifier resin to the reactor after the reaction in step 1), maintaining the inert atmosphere in the reactor, increasing the temperature to 100-120° C., stirring for uniform mixing, followed by adding 25-45 parts of dehydrated crystalline polyester polyol and 6-20 parts of dehydrated polyether polyol, and reacting under stirring and the constant temperature of 100-120° C. for 0.5-2 hours;

3) adding 15-35 parts of dehydrated polyether amine to the reactor after the reaction in step 2), maintaining the inert atmosphere in the reactor, and reacting under stirring and the temperature of 115-140° C. for 1-2 hours; and 4) adding 0.01-0.2 parts of catalyst into the reactor after the reaction in step 3), vacuumizing to remove bubbles, discharging materials and packaging the materials in an airtight container.

The principle that the polyurethane hot melt adhesive prepared by the present invention shows high temperature resistance is explained as follows.

1) The isocyanate adopted by the present invention has high aromatic ring content and good heat resistance. The degree of functionality of the isocyanate is more than 2.5, the degree of functionality of NCO group of isocyanate is reduced to about 2.0 with silane modifier, forming NCO group with dual functional structure that participates in the chain extension reaction of polyols. After bonding and curing, the side chain siloxane is hydrolyzed and dealcoholized, which promotes the curing reaction to form three-dimensional network structure. Thus, a high-density cross-linked network structure is formed, and the heat resistance is improved.

2) The heat resistance of urea bond formed by the chain extension reaction of polyether amine and NCO group is higher than that of urethane bond, at the same time, urea bond also effectively improves the flexibility, final adhesive strength and impact resistance of the product.

3) By using polyether polyol and polyether amine with specific proportion and introducing ether bond into the molecular chain, the flexibility and impact resistance of the product are effectively improved, and the defects such as cracking and poor impact resistance caused by too strong rigidity of molecular structure are avoided, which may lead to excessive high brittleness of the product.

4) The crystalline polyester polyol has special molecular functional structure. Its active functional group and isocyanate are subjected to polymerization, which effectively improves the crystallinity of hot melt adhesive and improves the adhesive performance of hot melt adhesive.

5) The polyol used in the present invention is composed of crystalline polyester polyol and non-crystalline polyether polyol. Increasing the amount of crystalline polyester polyol can improve the initial strength, but the excessive large crystallinity will densify the adhesive layer, which will hinder the water vapor entering and slow down the curing speed. Increasing the amount of non-crystalline polyol can prolong the opening time, but lower the initial strength. Therefore, it is necessary to balance the amounts of various polyols in order to obtain good performance.

Based on the technical solution described above, the present invention may be modified as follows.

Further, the isocyanate is any one of the group consisting of polyphenyl polyisocyanate (PAPI), triphenylmethane triisocyanate (TTI), 2,4-toluene diisocyanate trimer, and hexamethylene diisocyanate (HDI) trimer. Preferably, the isocyanate is at least one selected from the group consisting of PM-200 sold by Yantai Wanhua Co., Ltd., MR-200 sold by Mitsui Chemical Co., Ltd. in Japan and HDI trimer Desmodur N3300 sold by Bayer company in Germany.

Further, the silane modifier is at least one selected from the group consisting of mercaptopropyltriethoxysilane (KH-580), mercaptopropyltrimethoxysilane (KH-590), ethyldiaminopropyltrimethoxysilane (KH-792), N-phenyl-γ-aminopropyltrimethoxysilane (Y-9669).

Further, the polyether amine is any one selected from the group consisting of copolyether diamine with amino terminal, and polyether diamine with aromatic amino terminal group with PTMEG as the main chain. Preferably, the polyether amine is one selected from the group consisting of D230 in America Huntsman, EC301 in Germany BASF, Versalink P-250 in American air chemistry.

Further, the crystalline polyester polyol is one of the products polymerized by polytetrahydrofuran glycol or adipic acid with at least one of 1,4-butanediol, glycol, diglycol, and 1,6-hexanediol. The polytetrahydrofuran glycol is PTMEG-200, PTMEG-300. The polyhexamethylene adipate glycol XCP-3000H sold by Jiangsu xuchuan Chemical Co., Ltd. is preferred. The poly(1,4-butylene adipate) POL-356T sold by Qingdao xinyutian Chemical Co., Ltd. is preferred.

Further, the polyether polyol is one of the following materials with the molecular weight of 400-700 g/mol: polyoxypropylene glycol and polyoxypropylene-ethylene glycol. Preferably, the polyether polyol is one or two selected from the group consisting of DL-400 of Bluestar Dongda and PPG204, PPG206 and PPG207 of Tianjin Petrochemical Co., Ltd.

Further, the catalyst is one of dibutyltin dilaurate, stannous octoate, lead caprylate, triethylamine, triethylenediamine, cobalt octanoate, zinc naphthenate, tetraisobutyl titanate and dimorpholine diethyl ether (DMDEE).

Further, the chemical dehydrant is at least one selected from the group consisting of p-Toluenesulfonyl Isocyanate (PTSI), triethyl orthoformate, and oxazolidine compounds.

Further, the diluent is diisopropylnaphthalene which is Ruetasolv DI, Rutgers in Germany.

Further, the tackifier resin is at least one selected from the group consisting of phenolic resin, terpene resin, polymerized rosin, acrylic resin, and petroleum resin. Octyl phenolic resin TXN-203 from Shanxi Chemical Research Institute, petroleum resin Novares LA700P from Rutgers in Germany and xylene resin 2602 from Shandong Shengquan chemical are preferred.

The polyurethane hot melt adhesive obtained by the method of the present invention has the following advantages in addition to excellent high temperature resistance: (1) Good toughness and adhesive strength can overcome the influence of the difference of expansion coefficient between different materials, and the stress distribution is uniform, so that different types of base materials can be adhered. (2) Excellent cold and hot shock resistance: no cracking appears after 24 cycles in the cold and hot shock box at −40° C. to +100° C. (3) Low viscosity and ease of operation: the melting viscosity at 100° C. is lower than 7 Pa. S. (4) Good thermal stability: when heated at 120° C. for 5 hours, the viscosity increases less than 30%. (5) Good drop resistance: no cracking appears after 1000 times of roller drop test. (6) High final adhesive strength: the adhesive strength of PC and PET is higher than 10.0 MPa.

DETAILED DESCRIPTION OF THE EMBODIMENTS

Hereinafter, the principles and features of this invention will be described with reference to the embodiments. The examples are only to illustrate the invention and are not to limit the scope of the invention.

The raw materials in the following examples are all parts by weight: the multifunctional isocyanate PM-200 is sold by Yantai Wanhua Co., Ltd., Desmodur N3300 is sold by Bayer company in Germany, the multifunctional isocyanate MR-200 is sold by Mitsui Chemical Co., Ltd. in Japan, the polyether polyols PPG204 and PPG207 are sold by Tianjin Petrochemical Co., Ltd., the polyester polyol POL-356T is sold by Qingdao xinyutian Chemical Co., Ltd., the polyester polyol XCP-3000H is sold by Jiangsu xuchuan Chemical Co., Ltd., and the polyester polyol XCP-3000H has hydroxyl value of 35-39 mgKOH/g and acid value of 0.1-0.8 mgKOH/g, the polyether amine D230 is sold by America Huntsman, the polyether amine EC301 is sold by Germany BASF, and the polyether amine Versalink P-250 is sold by American air chemistry.

Example 1

1) 15 parts of the multifunctional isocyanate PM-200 was added to the reactor. The temperature was raised to 80° C. under the condition of nitrogen protection, then 3.0 parts of silane modifier mercaptopropyltrimethoxysilane (KH-590) was added to the reactor for reacting under the stirring of 700 rpm and the temperature of 80° C. for 1 hours to obtain isocyanate derivatives with an average functionality of 1.7. After the reaction was ended, 0.04 parts of triethyl orthoformate was added into the reactor to mix evenly.

2) 1 part of diisopropylnaphthalene (D1) and 13 parts of xylene formaldehyde resin 2602, which were subjected to water removal in advance, were added to the reactor. Under the condition of nitrogen protection, the temperature was increased to 120° C., the materials were stirred and mixed evenly, and then 25 parts of the crystalline polyester polyol PTMEG-300 and 20 parts of polyether polyol PPG-204, which were subjected to water removal in advanced, were added into the materials for reacting under the stirring of 400 rpm and the temperature of 120° C. for 80 minutes.

3) 35 parts of polyether amine Versalink P-250, which was subjected to water removal in advance, was added to the reactor after the reaction in step 2). The nitrogen protection was maintained in the reactor and the reaction was performed under the stirring of 900 rpm and the temperature of 115° C. for 1 hour.

4) 0.2 parts of catalyst triethylamine was added into the reactor after the reaction in step 3), vacuumization was performed to remove bubbles, then materials were discharged and hermetically packaged to obtain the polyurethane hot melt adhesive with high temperature resistance.

Example 2

1) 10 parts of the multifunctional isocyanate Desmodur N3300 was added to the reactor. The temperature was raised to 70° C. under the condition of nitrogen protection, then 1.6 parts of silane modifier N-phenyl-γ-aminopropyltrimethoxysilane (Y-9669) was added for reacting under the stirring of 550 rpm and the temperature of 70° C. for 3 hours to obtain isocyanate derivatives with an average functionality of 1.85. After the reaction was ended, 0.03 parts of p-Toluenesulfonyl Isocyanate PTSI was added into the reactor to mix evenly.

2) 5 parts of diisopropylnaphthalene (D1) and 7 parts of phenolic resin TXN-203, which were subjected to water removal in advance, were added to the reactor. Under the condition of nitrogen protection, the temperature was increased to 110° C., the materials were stirred and mixed evenly, and then 36 parts of the crystalline polyester polyol XCP-3000H and 14 parts of polyether polyol DL-400, which were subjected to water removal in advance, were added into the materials for reacting under the stirring of 600 rpm and the temperature of 110° C. for 2 hours.

3) 25 parts of polyether amine D230, which was subjected to water removal in advance, was added to the reactor after the reaction in step 2). The nitrogen protection was maintained in the reactor and the reaction was performed under the stirring of 700 rpm and the temperature of 130° C. for 1.5 hours.

4) 0.11 parts of catalyst dimorpholine diethyl ether DMDEE was added into the reactor after the reaction in step 3), vacuumization was performed to remove bubbles, materials were discharged and hermetically packaged to obtain the polyurethane hot melt adhesive with high temperature resistance.

Example 3

1) 20 parts of the multifunctional isocyanate MR-200 was added to the reactor. The temperature was raised to 60° C. under the condition of nitrogen protection, then 0.3 parts of silane modifier ethyldiaminopropyltrimethoxysilane KH-792 was added to the reactor for reacting under the stirring of 400 rpm and the temperature of 60° C. for 2 hours to obtain isocyanate derivatives with an average functionality of 2.0. After the reaction was ended, 0.005 parts of oxazolidine dehydrant was added into the reactor to mix evenly.

2) 3 parts of diisopropylnaphthalene (D1) and 20 parts of petroleum resin LA700P, which were subjected water removal in advance, were added to the reactor. Under the condition of nitrogen protection, the temperature was increased to 100° C., the materials were stirred and mixed evenly, and then 45 parts of the crystalline polyester polyol POL-356T and 6 parts of polyether polyol PPG-207, which were subjected to water removal in advance, were added into the materials. for reacting under the stirring of 700 rpm and the temperature of 100° C. for 0.5 hours.

3) 15 parts of polyether amine EC-301, which was subjected to water removal in advance, were added to the reactor after the reaction in step 2). The nitrogen protection was maintained in the reactor and the reaction was performed under the stirring of 1100 rpm and the temperature of 140° C. for 2 hours.

4) 0.01 parts of catalyst dibutyltin dilaurate was added into the reactor after the reaction in step 3), vacuumization was performed to remove bubbles, materials were discharged and hermetically packaged to obtain the polyurethane hot melt adhesive with high temperature resistance.

Example 4

1) 15 parts of the multifunctional isocyanate PM-200 was added to the reactor. The temperature was raised to 80° C. under the condition of nitrogen protection, then 3.0 parts of silane modifier mercaptopropyltrimethoxysilane (KH-590) was added to the reactor for reacting under the stirring of 700 rpm and the temperature of 80° C. 1 hour to obtain isocyanate derivatives with an average functionality of 1.7. After the reaction was ended, 0.04 parts of triethyl orthoformate was added into the reactor to mix evenly.

2) 1 part of diisopropylnaphthalene (D1) and 13 parts of polymerized rosin, which were subjected to water removal in advance, were added to the reactor. Under the condition of nitrogen protection, the temperature was increased to 120° C., the materials were stirred and mixed evenly, and then 25 parts of the crystalline polyester polyol PTMEG-300 and 20 parts of polyether polyol PPG-204, which were subjected to water removal in advance, were added into the materials for reacting under the stirring of 400 rpm and the temperature of 120° C. for 80 minutes.

3) 35 parts of polyether amine Versalink P-250, which was subjected to water removal in advance, was added to the reactor after the reaction in step 2). The nitrogen protection was maintained in the reactor and the reaction was performed under the stirring of 900 rpm and the temperature of 115° C. for 1 hour.

4) 0.2 parts of catalyst lead caprylate was added into the reactor after the reaction in step 3), vacuumization was performed to remove bubbles, materials were discharged and hermetically packaged to obtain the polyurethane hot melt adhesive with high temperature resistance.

Example 5

1) 10 parts of the multifunctional isocyanate Desmodur N3300 was added to the reactor. The temperature was raised to 70° C. under the condition of nitrogen protection, then 1.6 parts of silane modifier N-phenyl-γ-aminopropyltrimethoxysilane (Y-9669) was added to the reactor for reacting under the stirring of 550 rpm and the temperature of 70° C. for 3 hours to obtain isocyanate derivatives with an average functionality of 1.85. After the reaction was ended, 0.03 parts of p-Toluenesulfonyl Isocyanate PTSI was added into the reactor to mix evenly.

2) 5 parts of diisopropylnaphthalene (D1) and 7 parts of acrylic resin, which were subjected to water removal in advance, were added to the reactor. Under the condition of nitrogen protection, the temperature was increased to 110° C., the materials were stirred and mixed evenly, and then 36 parts of the crystalline polyester polyol XCP-3000H and 14 parts of polyether polyol DL-400, which were subjected to water removal in advance, were added into the materials for reacting under the stirring of 600 rpm and the temperature of 110° C. for 2 hours.

3) 25 parts of polyether amine D230, which was subjected to water removal in advance, was added to the reactor after the reaction in step 2). The nitrogen protection was maintained in the reactor and the reaction was performed under the stirring of 700 rpm and the temperature of 130° C. for 1.5 hours.

4) 0.11 parts of catalyst tetraisobutyl titanate was added into the reactor after the reaction in step 3), vacuumization was performed to remove bubbles, materials were discharged and hermetically packaged to obtain the polyurethane hot melt adhesive with high temperature resistance.

Comparative Example

The formula and production process of traditional moisture cure PUR adhesive are as follows: 20 parts of polyether polyol PPG210 and 45 parts of polyester polyol POL-356T were added into the reactor, stirred at 500 rpm, dehydrated in vacuum at 120° C. for 2 hours, and the vacuum degree is kept at −0.09 MPa. Then, the mixture was cooled to 80° C., added with 15 parts of 4,4'-diphenylmethane diisocyanate MDI while stirring, then the temperature was slowly increased, the temperature was controlled at 80° C., nitrogen was filled for protection, and the reaction was performed for 2.5 hours. After the content of NCO % reached the design value, 15 parts of terpene tackifier, 0.1 parts of catalyst dibutyltin dilaurate and 0.4 parts of triethylenediamine were added into the reactor. Under the temperature of 110° C., vacuumization was performed until there is no bubble, followed by discharging the material, sealing and packaging for use. When the adhesive is used in the process, first the heating system was initiated, setting the temperature to 100-130° C., the adhesive was applied with the glue gun, ensuring that the adhesive applying process was completed within the opening time, and then test was performed according to the regulations. The high temperature resistance, cold and heat shock resistance, drop resistance, adhesive strength and moisture and heat aging resistance were all tested after 7 days at room temperature. Generally, the highest strength can be achieved after curing at room temperature for 7 days.

In order to verify the technical effect of the polyurethane hot melt adhesive obtained by the method of the present invention, we will carry out the shear strength at normal temperature, instant shear strength at 90° C., tensile strength, elongation at break, cold and hot shock resistance, roller drop test, salt spray test and double 85 aging test on the polyurethane hot melt adhesive prepared by examples 1 to 3 and the polyurethane hot melt adhesive prepared by comparative example according to the adhesive test standard. The test results are shown in Table 1, Table 2 and Table 3.

The ratio of the value of the instant shear strength at 90° C. to the value of the normal temperature shear strength is used to calculate the high temperature strength retention rate. The high temperature resistance of the adhesive is characterized by the numerical value of the high temperature strength retention rate, which is the core index of the present invention. In addition, the flexibility, adhesive strength, cold and hot shock resistance and drop resistance toughness of the present invention are respectively characterized by the values of tensile strength, elongation at break, shear strength at normal temperature, roller drop test, and cold and hot shock resistance in Table 2, the salt spray resistance. and moisture and heat aging resistance are characterized by the values of test items in Table 3.

TABLE 1

Comparison of high temperature resistance test of products obtained from examples 1-3 and comparative example

| Sample | Shear strength at room temperature (MPa) GB7124-86 | Instant shear strength at 90 ° C. (MPa) GB7124-86 | High temperature strength retention rate |
|---|---|---|---|
| example 1 | 12.8 | 4.6 | 36.0% |
| example 2 | 13.9 | 4.9 | 35.8% |
| example 3 | 11.6 | 4.0 | 34.3% |
| comparative example | 9.8 | 0.9 | 9.2% |

TABLE 2

Comparison of the mechanical property test of products obtained from examples 1-3 and comparative example

| | Tensile strength (MPa) ASTM D638 | Elongation at break (%) ASTM D638 | Shear strength (MPa) GB7124-86 | Roller drop test(1000 times, red ink penetration test) | Thermal and cold shock property ASTMD-746,-40-100 ° C., 15 days |
|---|---|---|---|---|---|
| example 1 | 10.3 | 950 | 12.8 | No damage and crack | No peeling |
| example 2 | 11.4 | 1020 | 13.9 | No damage and crack | No peeling |
| example 3 | 9.1 | 990 | 11.6 | No damage and crack | No peeling |
| comparative example | 7.5 | 890 | 9.8 | 15% damage and crack | Individual peeling |

TABLE 3

Comparison of water resistance and aging resistance test of products obtained from examples 1-3 and comparative example

| Sample | 500 hours salt spray chamber test (NaCl concentration is 5%, test temperature is 45° C.) | 85° C. 85% shear strength before test (MPa) GB7124-86 | 85° C. 85% shear strength after 1000 hours of test (MPa) GB7124-86 |
|---|---|---|---|
| example 1 | No blistering and peeling of coating | 12.8 | 5.7 |
| example 2 | No blistering and peeling of coating | 13.9 | 5.4 |
| example 3 | No blistering and peeling of coating | 11.6 | 6.2 |
| comparative example | Coating blistering of coating, and individual peeling | 9.8 | 2.6 |

According to the performance test analysis of examples 1 to 3 and comparative example in Table 1 to Table 3, the polyurethane hot melt adhesive prepared by the invention has improved-to-superior high-temperature resistance, cold and heat shock resistance, drop resistance toughness, adhesive strength, salt spray resistance and moisture and heat aging resistance. Therefore, the polyurethane hot melt adhesive provided by the invention can meet the adhesive requirements of specific high temperature environment, and has important practical significance for improving the core competitiveness of domestic polyurethane hot melt adhesive.

The above-described examples are preferred embodiments of the present invention, which is not to limit the invention. Within the spirit and principle of the invention, any modification, the equivalent replacement and improvement should be included in the protection scope of the invention.

What is claimed is:

1. A method of preparing polyurethane hot melt adhesive having high temperature resistance, comprising the following steps:
   1) adding 10-20 parts by weight of isocyanate with an average functionality of more than 2.5 to a reactor and maintaining an inert atmosphere, heating the reactor to a temperature of 60-80° C., then adding 0.3-3.0 parts by weight of silane modifier to the reactor, and stirring while maintaining a constant temperature of 60-80° C. for 1-3 hours to obtain isocyanate derivatives with an average functionality of 1.5-2.0 from a reaction, and then adding 0.005-0.04 parts by weight of chemical dehydrant into the reactor and mixing evenly;
   2) adding 1-5 parts by weight of dehydrated diluent and 7-20 parts by weight of dehydrated tackifier resin to the reactor after the reaction in step 1), maintaining the inert atmosphere in the reactor, increasing a temperature of the reactor to 100-120° C., stirring for uniform mixing, followed by adding 25-45 parts by weight of dehydrated crystalline polyester polyol and 6-20 parts by weight of dehydrated polyether polyol, and reacting under stirring and the temperature of 100-120° C. for 0.5-2 hours;
   3) adding 15-35 parts by weight of dehydrated polyether amine to the reactor after the reaction in step 2), maintaining the inert atmosphere in the reactor, and reacting under stirring and a temperature of 115-140° C. for 1-2 hours; and
   4) adding 0.01-0.2 parts by weight of catalyst into the reactor after the reaction in step 3), vacuumizing to remove bubbles, discharging materials from the reactor and hermetically packaging the materials to obtain the polyurethane hot melt adhesive with high temperature resistance.

2. The method of claim 1, wherein the isocyanate is one of polyphenyl polyisocyanate, triphenylmethane triisocyanate, 2,4-toluene diisocyanate trimer, and hexamethylene diisocyanate trimer.

3. The method of claim 2, wherein the chemical dehydrant is at least one of P-toluenesulphonylhydrazide isocyanate, triethyl orthoformate, and oxazolidine compounds.

4. The method of claim 2, wherein the dehydrated diluent is diisopropylnaphthalene.

5. The method of claim 1, wherein the silane modifier is at least one of mercaptopropyltriethoxysilane, mercaptopropyltrimethoxysilane, ethyldiaminopropyltrimethoxysilane, and N-phenyl-γ-aminopropyltrimethoxysilane.

6. The method of claim 5, wherein the chemical dehydrant is at least one of P-toluenesulphonylhydrazide isocyanate, triethyl orthoformate, and oxazolidine compounds.

7. The method of claim 5, wherein the dehydrated diluent is diisopropylnaphthalene.

8. The method of claim 1, wherein the dehydrated polyether amine is one of copolyether diamine with amino terminal, and polyether diamine with aromatic amino terminal group with PTMEG (polytetramethylene ether glycol) as the main chain.

9. The method of claim 8, wherein the chemical dehydrant is at least one of P-toluenesulphonylhydrazide isocyanate, triethyl orthoformate, and oxazolidine compounds.

10. The method of claim 8, wherein the dehydrated diluent is diisopropylnaphthalene.

11. The method of claim 1, wherein the dehydrated crystalline polyester polyol is formed by polymerizing one of polytetrahydrofuran glycol or adipic acid with at least one of 1,4-butanediol, glycol, diglycol, and 1,6-hexanediol.

12. The method of claim 11, wherein the chemical dehydrant is at least one of P-toluenesulphonylhydrazide isocyanate, triethyl orthoformate, and oxazolidine compounds.

13. The method of claim 11, wherein the dehydrated diluent is diisopropylnaphthalene.

14. The method of claim 1, wherein the dehydrated polyether polyol is one of the following materials with a molecular weight of 400-700 g/mol: polyoxypropylene glycol and polyoxypropylene-ethylene glycol.

15. The method of claim 14, wherein the chemical dehydrant is at least one of P-toluenesulphonylhydrazide isocyanate, triethyl orthoformate, and oxazolidine compounds.

16. The method of claim 1, wherein the catalyst is one of dibutyltin dilaurate, stannous octoate, lead caproate, triethylamine, triethylenediamine, cobalt octanoate, zinc naphthenate, tetraisobutyl titanate and dimorpholine diethyl ether.

17. The method of claim 16, wherein the chemical dehydrant is at least one of P-toluenesulphonylhydrazide isocyanate, triethyl orthoformate, and oxazolidine compounds.

18. The method of claim 1, wherein the chemical dehydrant is at least one of p-Toluenesulfonyl Isocyanate, triethyl orthoformate, and oxazolidine compounds.

19. The method of claim 1, wherein the dehydrated diluent is diisopropylnaphthalene.

20. The method of claim 1, wherein the dehydrated tackifier resin is at least one of phenolic resin, terpene resin, polymerized rosin, acrylic resin, and petroleum resin.

* * * * *